United States Patent [19]

Coleman

[11] Patent Number: 5,682,028

[45] Date of Patent: Oct. 28, 1997

[54] CIRCUITRY FOR BAR CODE SCANNERS

[75] Inventor: Edward P. Coleman, Fairport, N.Y.

[73] Assignee: PSC Inc., Webster, N.Y.

[21] Appl. No.: 283,013

[22] Filed: Jul. 29, 1994

[51] Int. Cl.[6] ........................................... G06K 7/10
[52] U.S. Cl. ........................... 235/462; 235/454
[58] Field of Search ......................... 235/462, 472, 235/454, 455, 436, 463; 250/555, 566, 271; 327/72

[56] References Cited

U.S. PATENT DOCUMENTS

| | | | |
|---|---|---|---|
| 3,694,629 | 9/1972 | Ogawa | 235/454 |
| 3,835,306 | 9/1974 | Bills et al. | 377/8 |
| 4,335,301 | 6/1982 | Palmer et al. | 235/462 |
| 4,348,656 | 9/1982 | Gorgone et al. | 340/146.3 |
| 4,517,455 | 5/1985 | Benitez, III et al. | 235/463 |
| 4,922,109 | 5/1990 | Bercovitz et al. | 250/556 |
| 5,200,597 | 4/1993 | Eastman | 235/455 |
| 5,206,553 | 4/1993 | Rockstein et al. | 235/462 |
| 5,210,397 | 5/1993 | Eastman | 235/436 |

*Primary Examiner*—Donald T. Hajec
*Assistant Examiner*—Jeffrey R. Filipek
*Attorney, Agent, or Firm*—Foley & Lardner

[57] ABSTRACT

In order to decode from electrical signals derived by a photodetector which responds to the light returned from the relatively less reflective (black) bars of the code and relatively more reflective (white) bars (also known as spaces), these signals must be digitized into a digital data signal where the black and white bars are represented by opposite logic levels, (for example logic high voltage levels representing the black bars, and logic low voltage levels representing the white bars). The high logic levels are pulses which are separated in time by the low logic levels. A cascade of amplifiers is used to amplify the bar code signal from the photo detector. An amplifier having a logarithmic signal compression characteristic is included in the cascade, preferably after an amplifier which serves to differentiate the signal. The amplified signal is applied to a digitizer including a comparator which is sensitive only to the leading edge. Additional features are networks which enable the maximum gain of amplifiers in the cascade to be varied in accordance with a digital code, amplifier circuitry which provides linear amplification until the signal level reaches a threshold at which time amplification follows the logarithmic compression characteristic, hysteresis which prevents the comparator from being reset until a transition between a signal corresponding to black and white bars is detected, which hysteresis is a fixed voltage level, and circuits for setting the comparator to a state corresponding to a white bar (logic low).

40 Claims, 7 Drawing Sheets

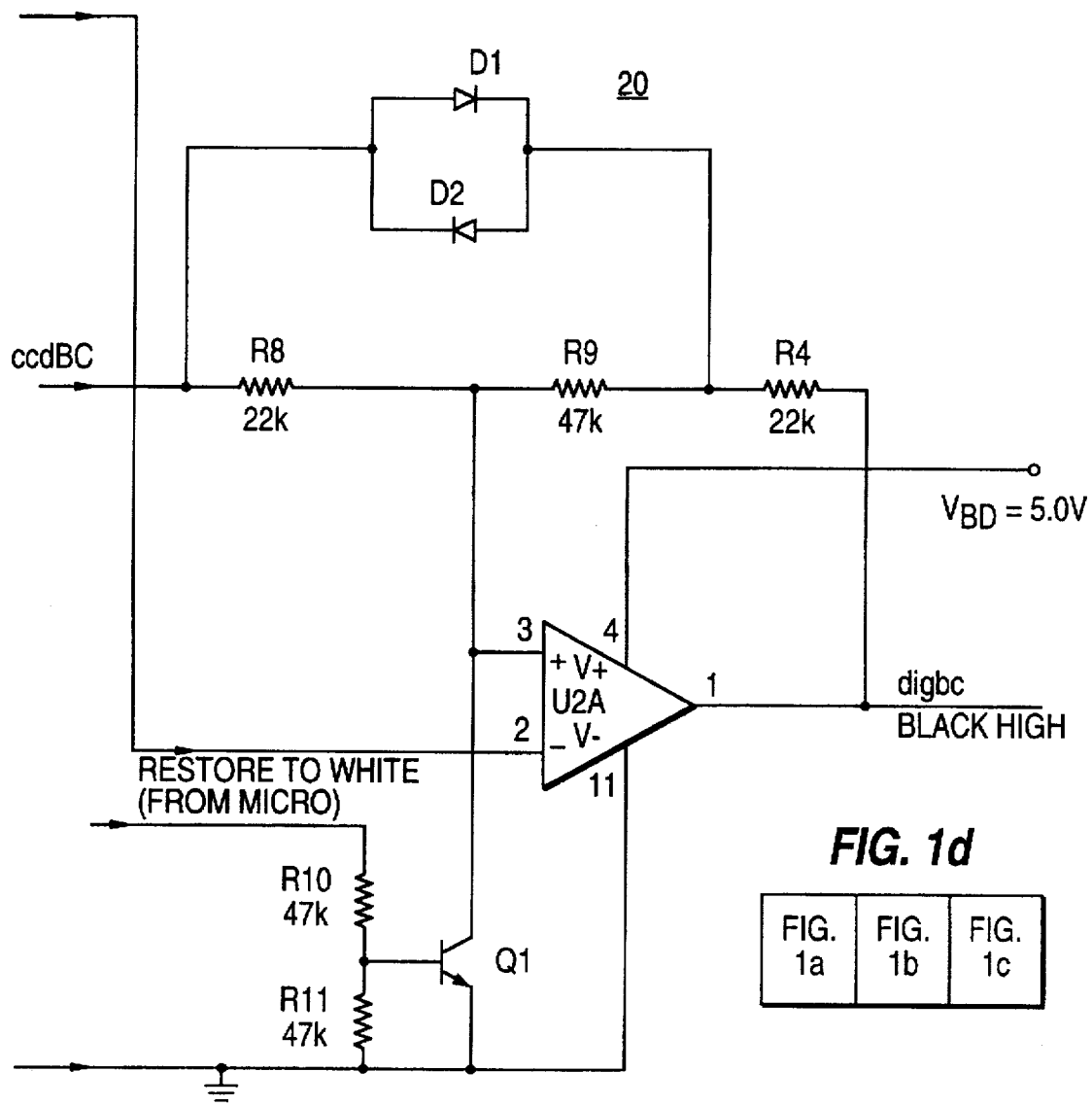

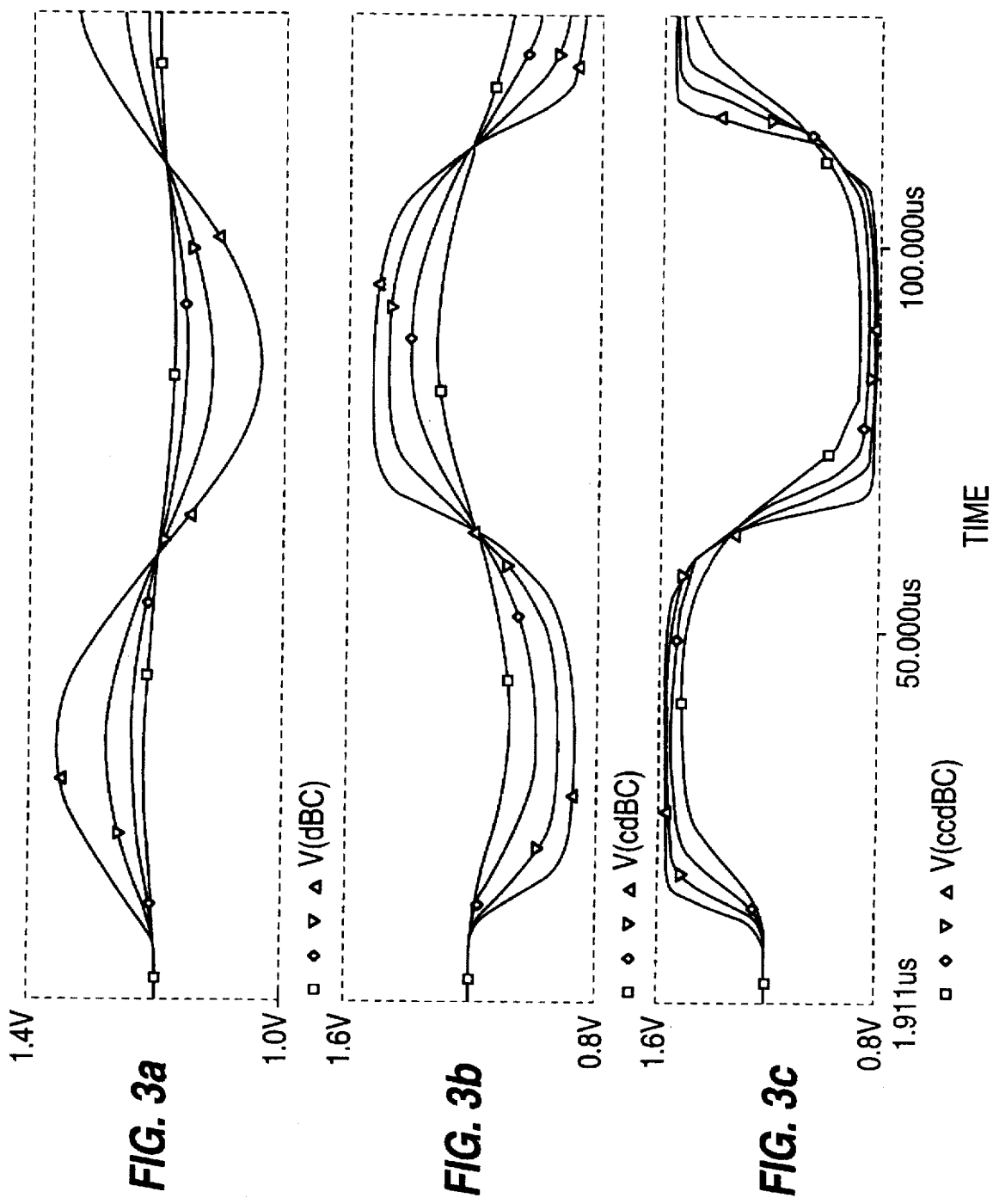

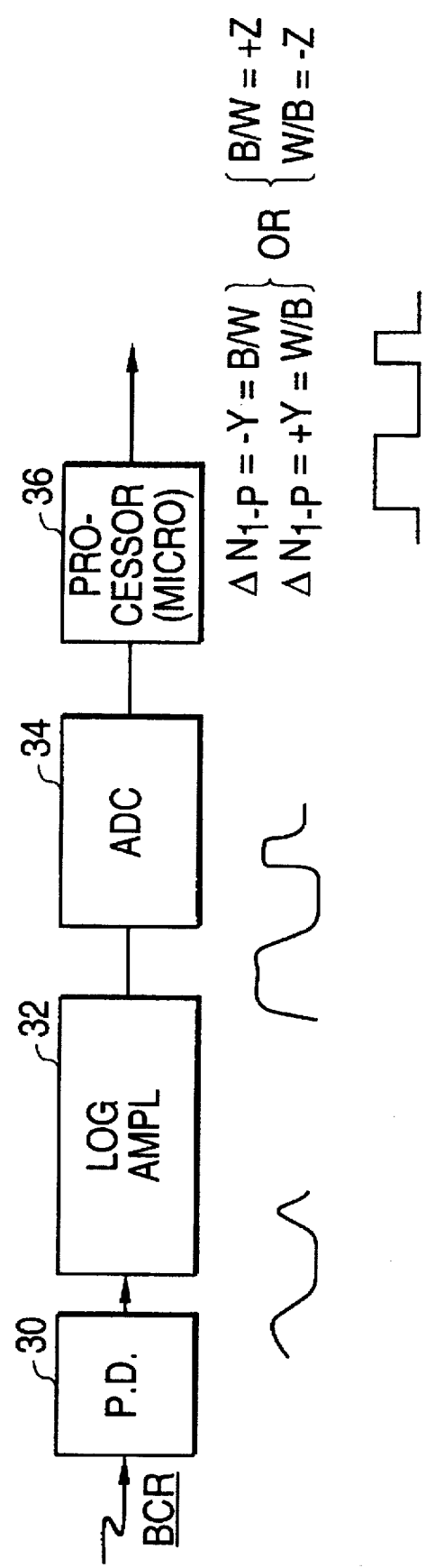

CIRCUITRY FOR BAR CODE SCANNERS

The present invention relates to circuitry for bar code scanners or readers and particularly to circuitry for translating the light returned from bars of relatively high and low reflectivity of the code as it is scanned into a temporal digital data stream, where the bars which are relatively more reflective and relatively less reflective are represented by different logic levels or states, the temporal width of which may be decoded to derive the data represented by the bar code.

The present invention is especially suitable for use in bar code scanners (by which term is meant instruments for reading bar codes even though the codes are scanned by devices separate therefrom) which is intended to read return light of intensity which may vary significantly, for example light returned from codes close to the scanner which is of much higher intensity than light returned from codes are more distant from the scanner, and also where the speed or rate at which the code is scanned may vary significantly either due to the scanning rate or due to the code being printed with bars of narrow width which produces higher rate or larger bandwidth signals than signals obtained from codes having wider bars. When higher reflectivity bars are referred to herein they may also be called spaces. The invention provides circuitry which translates the return light into electrical signals, amplifies those signals and digitizes the signals to provide a temporal digital signal of pulses, the width and separation of which may be decoded into the data represented by the scanned bar code. The signal thus constitutes pulses of opposite logic levels or states, the pulses being of the high logic level and their separation at lower logic level. This signal may be referred to as a digitized bar code signal.

The accuracy by which a bar code may be decoded from the digitized bar code signal depends upon the accuracy of the transitions between the high and low logic levels, that is the transition between a level representing a black bar and a level representing a white bar. These are called black to white or white to black transitions. The problem is exacerbated when the intensity of the return light varies greatly. Then there may be insufficient signal level to detect the transitions or the signal level may be so great as to saturate the circuitry, particularly amplifiers which process the bar code video signal. In either case distortion of the temporal location and the width or time between transitions occurs. This may result in an inability to decode and therefore read the bar code over the operating range of distances between the scanner and the code over which the bar code reading instrument is desired to operate.

It has been suggested that the transitions may be located by differentiating the bar code video signal and then utilizing the peaks of the differentiated signal to detect the transitions. See J. M. Eastman, U.S. Pat. No. 5,210,397 issued May 11, 1993. The peaks of the differentiated signal vary in amplitude with the amplitude of the detected bar code video signal and the problems of operating with bar code video signals which vary in amplitude over the range of the bar code scanner still remains. Adaptive amplifiers and amplifiers including automatic gain control systems have also been suggested, including a microprocessor controlled scanner which controls the gain of the bar code video signal amplifiers by sampling the signals on each scan and digitally adjusting the gain. See Eastman et al., U.S. Pat. No. 5,200,597 issued Apr. 6, 1992. Such amplifiers have a principal drawback in that they are costly. A secondary drawback is that they operate in a delayed mode; time being required for sampling an adjustment of the gain. Thus, the time to decode the bar code signal may be delayed in order allow for one or more scans of the code in order to adjust the gain.

It has been discovered in accordance with the invention that gain adjustment may be provided for automatically, in accordance with the amplitude of the signal being amplified, by an adjustable gain amplifier, the gain characteristic of which is such that gain varies inversely with signal amplitude. The resulting amplified signal is compressed in amplitude. A digitizer operates on this compressed, amplified signal to change state thereby providing the digital data signal having high and low logic states which transition at the edges of the bar code signal. The bar code video signal may be differentiated prior to gain compressed amplification. Then the differentiated signal is amplified. The digitizer is operative to change the output state only upon detection of the leading edge of the pulses which constitute the differentiated signal, thereby assuring that the digital data signal accurately reflects the width of the code.

It has been discovered in accordance with the invention that notwithstanding the compression of the signal as it is amplified, the digitized data signal nevertheless consists of pulses the edges of which correspond accurately to the transitions (black to white or white to black) between the bars of the code. Compression of the bar code video signal even after differentiation does not change the correspondence of the leading and lagging edges of the signal and the transitions (black to white or white to black) of the bars of the code, at least to such an extent as to affect rapid and accurate decoding from the digital data signal.

Features of the invention which contribute to the minimization of temporal distortion of the resulting digitized, digital data signal are presently believed to be as follows. The compression characteristic is made logarithmic. Amplification is linear at relatively low signal amplitude so that gain compression commences only after a period of linear amplification at a gain higher than when gain compression occurs.

Another feature is that the maximum gain of the gain compression amplifier may be varied and such variation can be provided in response to a digital code from a microprocessor of the scanner in which the circuitry including the gain compression amplifiers is contained. Thus the range of gain may be selected by program control or by the operator to compensate for variations in components used in the bar code scanner and manufacturing tolerances (e.g. laser diode output, detector sensitivity etc.) The digitizer is also provided with hysteresis so that the state of the digital data signal does not change until the output of the amplifiers ahead of the digitizer change or are offset by more than the hysteresis offset amplitude. The hysteresis is also of constant amplitude notwithstanding the level of the digital data output signal. The amplifiers and the digitizer are biased to operate in a bi-polar mode so as to accurately reflect the bar code video signals and enhance noise immunity. The gain in the amplifiers is greater for AC signals than for DC signals so that DC offsets in initial stages of amplification do not propagate to the digitizer and affect accuracy of digitization.

It is the principal object of this invention to provide bar code scanner circuitry which is capable of operating with light intensities and resulting bar code signals which vary over a wide range and bandwidth, commensurate with differences in range between the bar code and the scanner and differences in the bar code printing scanning rate or otherwise in the detection and processing of bar codes.

It is a further object of the present invention to provide improved, low cost bar code scanner circuitry which produces a digitized, digital data signal accurately reflecting the width of the bars of the code so that temporal distortion which can adversely affect decoding of the digital data signal is minimized.

It is a still further object of the present invention to provide improved bar code scanner circuitry having the features and advantages discussed above.

Briefly described, circuitry for a bar code scanner which processes light returned from bars of different reflectivity constituting the bar code, as the code is scanned, provides a digital data signal of pulses the temporal relationship of which represents the width of the bars of the code and the data represented by the code. The circuitry uses a photodetector which translates light returned from the code into a first electrical signal. A first amplifier including the photodetector amplifies this signal and produces a second signal. A second amplifier connected in cascade with the first amplifier and between the first amplifier and a digitizer amplifies the second signal and provides it to the digitizer in compressed form because the second amplifier has a gain characteristic which varies with the amplitude of the second signal. Preferably this gain characteristic is logarithmic. It is further preferred that the gain characteristic be linear and higher than the gain during logarithmic compression at low signal amplitudes. The digitizer converts the output of the gain compression amplifier into the pulses which constitute the digital data signal. These pulses having lagging and leading edges when the output of the second amplifier has at least certain changes in amplitude in opposite senses, thereby tracking the edges of the signal with the transitions between bars of higher and lower reflectivity of the code.

The foregoing and other objects, features and advantages of the invention will become more apparent from a reading of the following description in connection with the accompanying drawings in which:

FIGS. 1a, 1b and 1c combined as shown in FIG. 1d constitute a schematic diagram of bar code scanner circuitry in accordance with a presently preferred embodiment of the invention;

FIGS. 3a, 3b and 3c show signals at the output and inputs of the stages of the gain compression amplifiers illustrated in FIGS. 1a, b and c so as to show how the gain compression characteristic of the amplifier affects the output signal therefrom; and FIG. 4 is a block diagram of another embodiment of bar code circuitry in accordance with the invention.

Figure 1A:
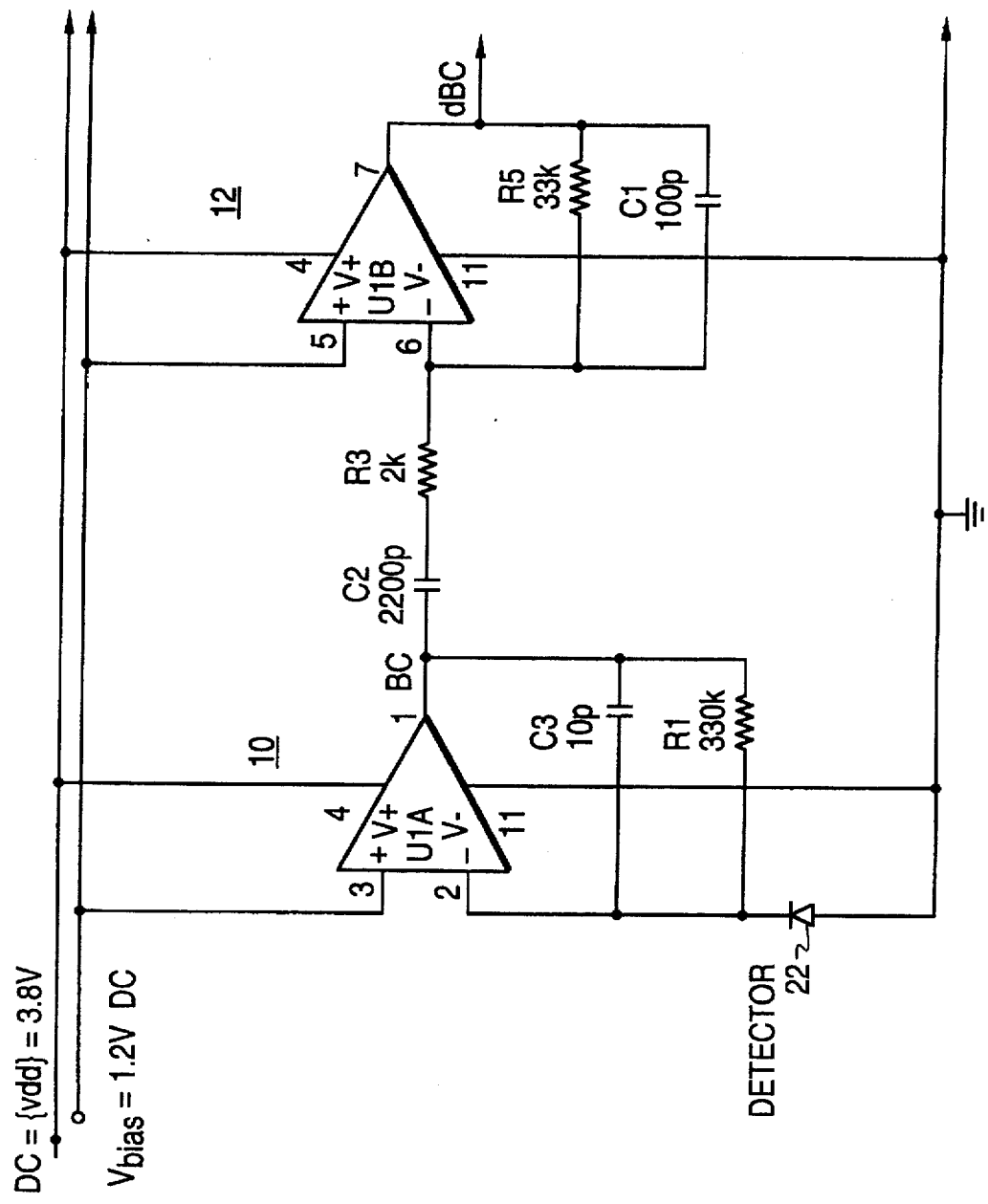
Figure 1B:
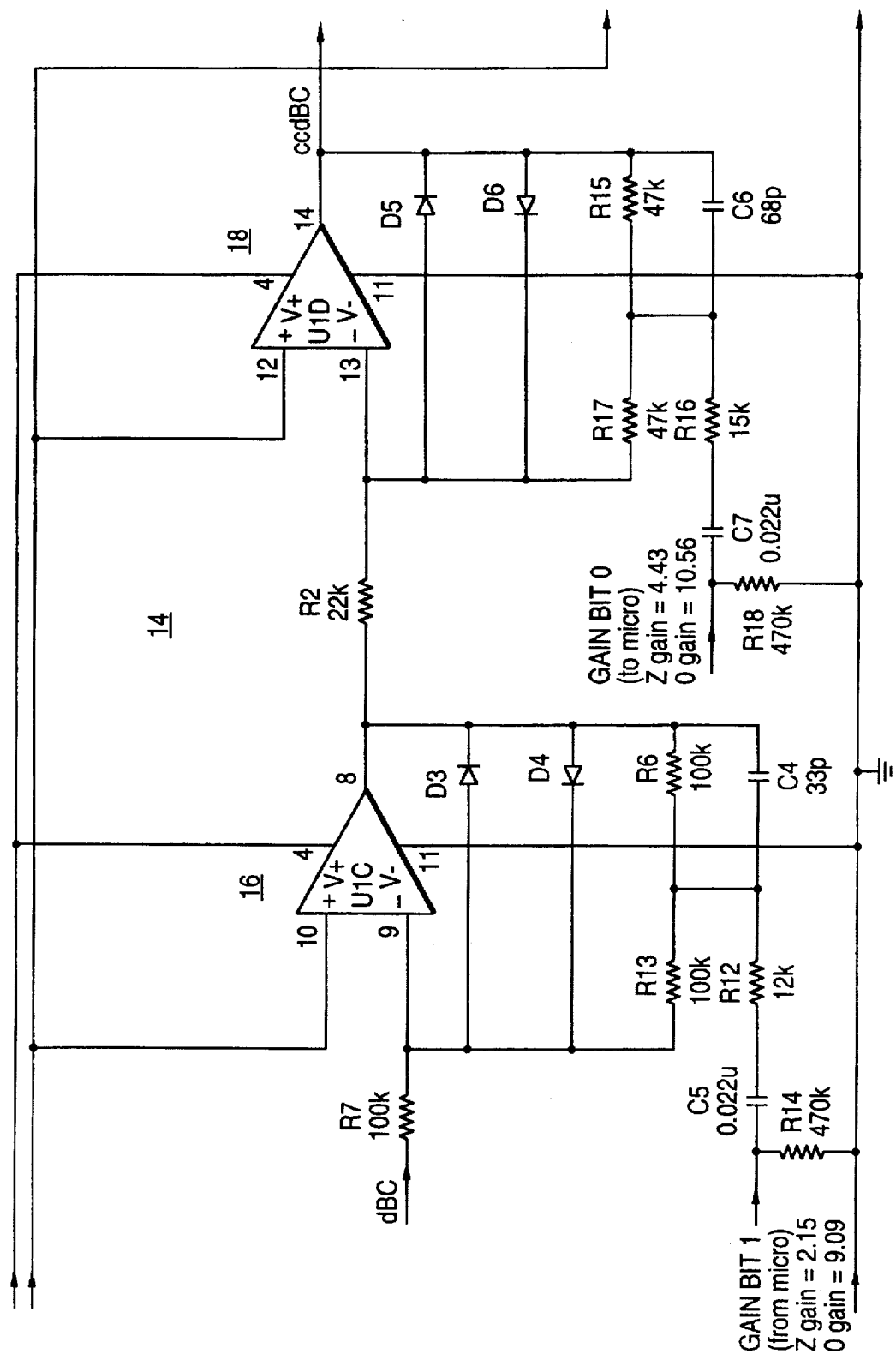

Referring to FIGS. 1a through 1d there is shown a schematic diagram of the presently preferred embodiment of the invention. Values are given for the components of the circuitry and the operating voltage values. These operating voltage values are DC operating voltage vdd of 3.8 volts (V), and $V_{bias}$ of 1.2 volts which like the 3.8 volts is DC. The operating voltage for the digitizer stage shown in FIG. 1c is $V_{BD}$ and is equal to 5.0 volts DC. The operational amplifiers used in the circuitry may be of the same type namely Texas Instrument type TLC 274. The diodes are all P-N junction diodes. A photo diode 22 is also used as the light detector or light to electrical signal transducer element. These operating voltage values, component values and component types are given by way of example and illustration only. Other components, operating voltage levels and integrated circuit amplifiers (operational amplifiers) or other types of amplifiers may be selected and will carry out the inventive concepts described and claimed herein.

In the operational amplifiers the inputs labeled by plus and minus are respectively the direct or non-inverting and the inverting inputs of the amplifiers. All of the amplifiers operate as inverting amplifiers. There is a transimpedance amplifier 10, a differentiating amplifier 12, a gain compression amplifier 14 made of two cascaded amplifier stages 16 and 18 and a digitizer 20. The transimpedance amplifier 10 is a unipolar amplifier; the output being of one polarity with respect to the bias voltage. The other amplifiers 12 and 14 and the digitizer 20 are bi-polar amplifiers, where the output swings positive and negative with respect to the bias voltage. The output voltages of the amplifiers are labeled BC, dBC, cdBC and ccdBC. BC is the bar code video signal from the transimpedance amplifier 10. dBC is the output of the differentiating amplifier 12. cdBC is the compressed differentiated bar code signal at the output of the first stage 16 of the compression amplifier 14. ccdBC is the compressed data from the second stage 18 of the compression amplifier. U2A:+ is the voltage at the non-inverting terminal of the comparator operational amplifier U2A in the digitizer 20. FIGS. 2b and 2d are labelled with triangles, squares and diamonds and show that the bar code video signal BC is unipolar while the other signals are bipolar.

The transimpedance amplifier 10 translates current through the detector photodiode 22, which receives the return light from the bar code, into a corresponding voltage which is the signal BC. Current through the detector 22 is principally through R1. C3 is used to stabilize the U1A stage and the bar code signal frequencies are below the frequency that is carried through C3, because of its small capacitance value (10 picofarads (p) in this example). The photodiode current is, therefore, effectively multiplied by the value of R1 and appears at BC. The current is in the hundred nanoamp range so that the voltage of BC is relatively low and requires amplification in order to enable the bar code video signal to be digitized. The voltage range, which is typical, is shown in FIG. 2b for a high frequency or rapid scan rate bar code video signal. FIG. 2d shows a signal which varies at a slower rate and appears to change between different levels at the bar code transitions (black to white and white to black). In FIG. 2, a black bar is shown as a high level and a white bar as a low level. The digitized wave form reflecting this digital data signal is illustrated in the wave form marked by the squares in FIGS. 2a and 2c. This is apparent also from the bar code video signal BC where more highly reflective white bars result in a relatively higher signal level than the less reflective black bars, as can be observed from the wave form marked with the diamonds in FIGS. 2b and 2d.

The differentiator time constant is determined principally by C2 and R5, although R3 (a lower values resistor than R5) is also included. C1 is principally for stabilization. That is, to prevent U1B from oscillating. At high frequencies, there is a phase delay between the bar code video signal BC and the derivative dBC thereof. The phase delay depends upon the frequency of the bar code video signal and is shown as being approximately 60° in FIG. 2b where the transitions are indicated by the generally vertical bars in the BC wave form. The phase shift for low frequency signal is less and the transitions in the BC signal are approximately coincident with the peaks of the differentiated signal (dBC) as shown in FIG. 2d.

It is desirable to utilize differentiated bar code signals, since their peaks locate the transitions between black and white bars of the code. While the undifferentiated bar code signal may be used and then amplified in the gain compression amplifier 14, it is preferable to differentiate the bar code signal before gain compression amplification. This is because the lagging and leading edges of the differentiated signal may be varied in slope due to compression. The peak of the differentiated signal remains unaffected in its temporal location upon compression. Thus, temporal distortion in the digitized, digital data signal representing the bar code, which is obtained from the digitizer is reduced by locating the differentiator 12 before the gain compression amplifiers in the cascade of amplifier 14 which are used in accordance with the invention.

The stages 16 and 18 of the gain compression amplifier are essentially similar in design, but utilize components of different value in order to obtain different maximum gain. The gain may be varied in accordance with a code made up of two gain bits, which are gain bit zero and gain bit one indicating the order of the bits in the code. The two bits together make up a binary code that can vary between 00 and 11. The gain is varied by providing the code, say from the microprocessor of the scanner containing the circuitry shown in FIGS. 1a through 1d. When the microprocessor gain bit is a 1, the microprocessor presents an open circuit across resistor R14 or R18 in "T" networks of the stages 16 and 18. When the gain bits are zero, a low impedance condition occurs. The high impedance condition is indicated as Z gain and the low impedance condition is indicated as the Ø gain. The binary value of the maximum gains is selectable and correspondence to the binary value of the gain bit number. Thus, in this example when the gain bits are ØØ, the gain (the product of the Z gains) is approximately 9.5. When the highest order gain bit (gain bit 1 is a 1), The gain is approximately 10 times as great or approximately 96 which is on the order of eight times ten. Thus, it will be apparent that the gains are weighted and approximately binarily related in accordance with the value of the gain bit code. R14 and R18 in the legs of the Ts allow C5 and C7 to charge when the gain bits are one (high impedance state) and prevent noise from entering the amplifier 14 when the bits from the microprocessor change from high to low.

The DC gain of the amplifier 14 is much lower than its AC gain, because of the frequency response characteristics of the amplifiers as set by the T circuits. These circuits, in the case of the amplifier 16, consist of R6 and R13 in the head of the T, where R6 is connected in parallel with C4. The leg of the T, which is connected between the junction of R6 and R13 consists of R12, C5 and R14. C5 is a relatively low AC impedance pass due to its high capacitance value and serves, not only as a frequency determining element, but also to block the DC component of the control code from the microprocessor. Since the frequency response of the amplifier is such that the AC gain is much higher than the DC gain, DC offsets which are inherent in operational amplifiers do not propagate at full gain, but see only low gain through the amplifier 14 to the digitizer 20. If T networks were not used, then AC coupling in the form of a capacitor between the stages 16 and 18 can be used to block the propagation of DC offsets.

It will be appreciated that in the case of the stage 18, R17 and R15 (R15 shunted by C6) define the head of the T and R16, C7 and R18, define the leg of the T network. The resistors R6 and R13 in stage 16 and R15 and R17 in stage 18, together with the input resistors R7 for stage 16 and R2 for stage 14 determine principally the DC gain of the respective stages. The amplifier 16 and 18 act as linear amplifiers until shunting diodes D3 or D4, in case of stage 16 and D5 and D6 in this case of stage 18, until the signal amplitude across R6 and R13 and R15 and R17 reach the diodes threshold voltage. These diodes are P-N junction diodes and have a threshold voltage of about one-half volt. Thus, in the case of the amplifier 16, R6 and R13 determine the gain where the gain characteristic is linear, because the voltage current transfer response of R6 and R13 is linear (these resistors being linear elements), until the threshold is reached. The threshold is approximately 1.8 volts (the 1.2 volt bias, plus the 0.6v threshold voltage). Thus, the majority of the feedback current from the output of U1C at pin 8 flows through D4 for outputs above the bias voltage and the threshold voltage of D4. For outputs below the bias voltage and the threshold voltage of D3, the current flows through D3. Since the voltage current transfer characteristic across the PN junction diodes, D3 and D4, is proportional to the log of the junction current, the output voltage from the stage varies logarithmically with the input voltage. This logarithmic response takes over only after a linear response of the stage, which occurs at low signal amplitude levels before the diodes D3 and D4 conduct. This logarithmic response provides signal compression since the output of the amplifier 14 varies logarithmically, and in inverse relationship, with the input thereto, preventing the stage from becoming saturated for large amplitude bar code signals while providing a large signal gain for small amplitude bar code signals. The compression can be observed from wave forms V(cdBC) in FIGS. 2b and 2d. With a differentiated signal, (dBC) is amplified and compressed logarithmically. The timing of the peaks is preserved.

The second stage 18, operates in a manner similar to the first stage and provides further compression and amplification. The output voltage ccdBC is shown in wave forms of FIGS. 2a and FIGS. 2c. Compression is significant and the leading edge of the ccBD signals, which are in correspondence with the rising edge+a leading phase lag. (The peaks represent the actual real edges) of the differentiated bar code signals dBC as shown in FIG. 2b and 2c, contain the temporal information as to the transitions (black to white or white to black) of the bar code signal. These edges govern the times when the digitizer switches, so that its output changes state and provides accurate presentation of the temporal digitized bar code signal digbc, which appears at the out of U2a in the digitizer 20.

FIG. 3 shows the compression obtained for signals at the following values 20 mV (wave form marked by the squares), 40 mV (wave forms marked with the diamonds and 80 and 160 mV wave forms marked by the triangles with their apexes facing downwardly and upwardly respectively. The output of the compression amplifier for this range of input signals ccdBC as shown in wave form FIG. 3c, only varies 1.2 to 1 due to the signal compression. This increases the signal range the amplifiers can handle without saturation. FIG. 3b illustrates the signal at cdBC following one stage 16 of compression. The dynamic range of the signal at this point is 2.7 to 1. Unlike automatic gain control or adaptive sensing schemes which require sampling of the signal, the gain compression amplifiers require no processing delays, which result in more rapid processing of bar code signals. The compression amplifier is reduced in cost by virtue of their incorporation of the diodes in parallel with resistance elements to provide the logarithmic gain compression characteristics thereof. This avoids the need for biasing an unlinear element into its logarithmic voltage current transfer characteristic range, which requires additional components, not necessary when diodes are used to provide the logarithmic gain compression characteristic. In addition, the bandwidth of each state (its frequency response) and the ease of frequency stabilization is enhanced since the range of variation in feedback impedance is reduced by the linear resistive feedback circuit provided principally by the resistors R6, R13, R15 and R17 in the head of their T networks.

The digitizer 20 utilizes U2a as a comparator. Since the output U2a pin 1 is connected to the noninverting input at pin 3 via R4 and R9, the output digbc stays latched and varies between ground and five volts; the rail voltages vBD are five volts and ground. The rail terminals are indicated as V+ and V- and are at pins 14 and 11 in U2a. The digitizer circuit enables normal logic levels, five volts (high) and ground (low) to be obtained even though they are not equal to nor symmetrical with respect to the reference voltage level. This feature is obtained by virtue of the hysteresis circuit, including the resistors R9 and R8, which are bridged by diodes D1 and D2, which are connected in opposite polarity senses so that they conduct when the digitizer output (pin 1), with respect to the input at ccdBC have different polarity relationships. The hysteresis voltage is equal to the drop across the diode, D1 or D2, which conducts or threshold voltage of the conducting diode divided by the ratio of R8 to R9+R8. This is approximately 200 millivolts. In addition, temperature compensation is obtained since the temperature dependence of the diodes D1 and D2 compensates for the temperature dependence of the diodes D3, D4, D5 and D6 used in the compression stages 16 and 18. Furthermore fixed offsets are provided by the diodes D1 and D2, thereby making the digitizer 20 immune to offsets in the operational amplifiers V1B, C and D.

Figure 2A:
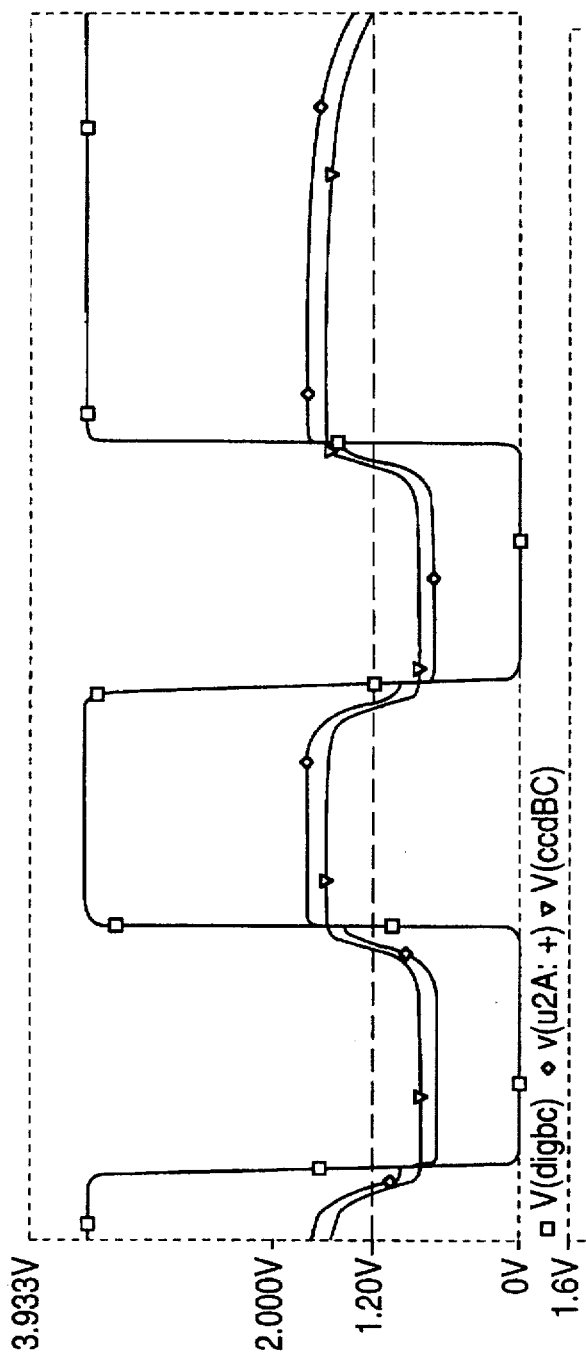
FIGS. 2a and 2b are wave forms illustrating the operation of the circuitry shown in FIGS. 1a, b & c when the bar code signal varies at a rapid rate.
Figure 2B:
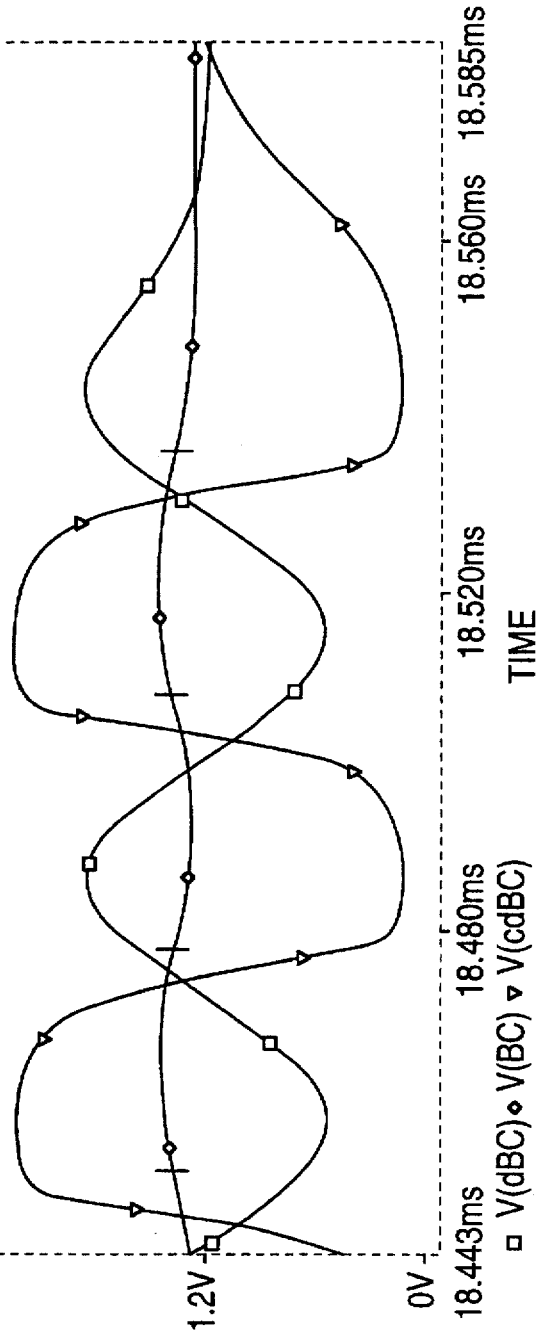
Figure 2C:
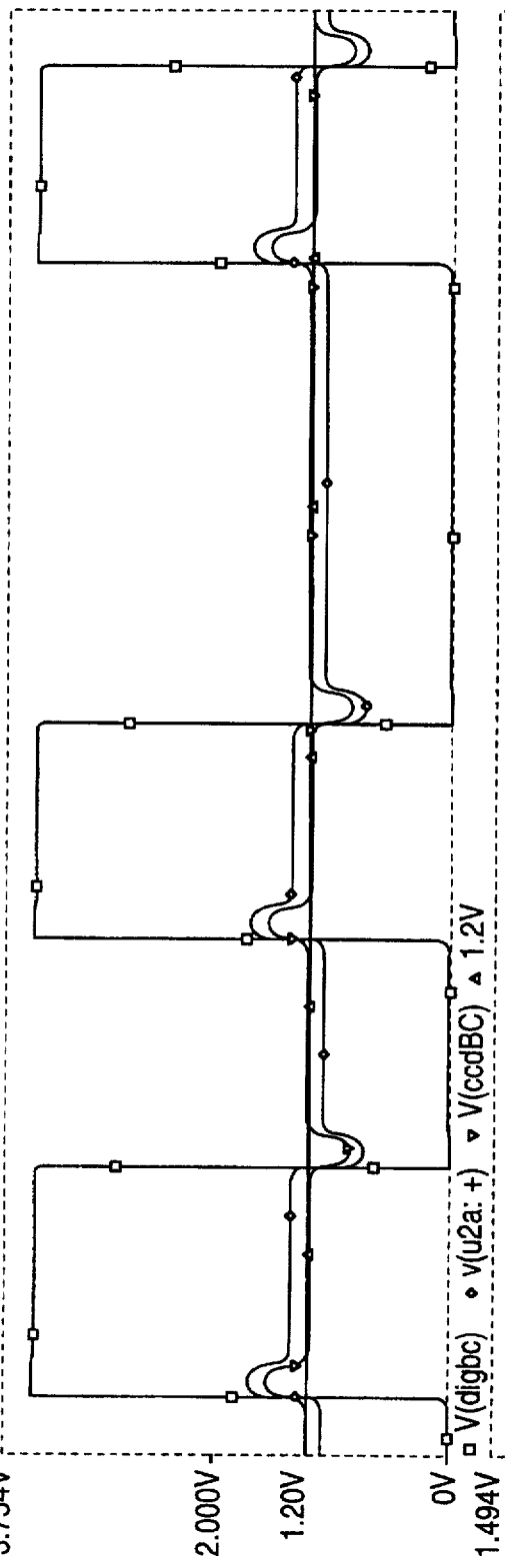
FIGS. 2c and 2d illustrate wave forms produced in the circuitry of FIGS. 1a, b and c when the bar code signal varies at a slower rate.
Figure 2D:
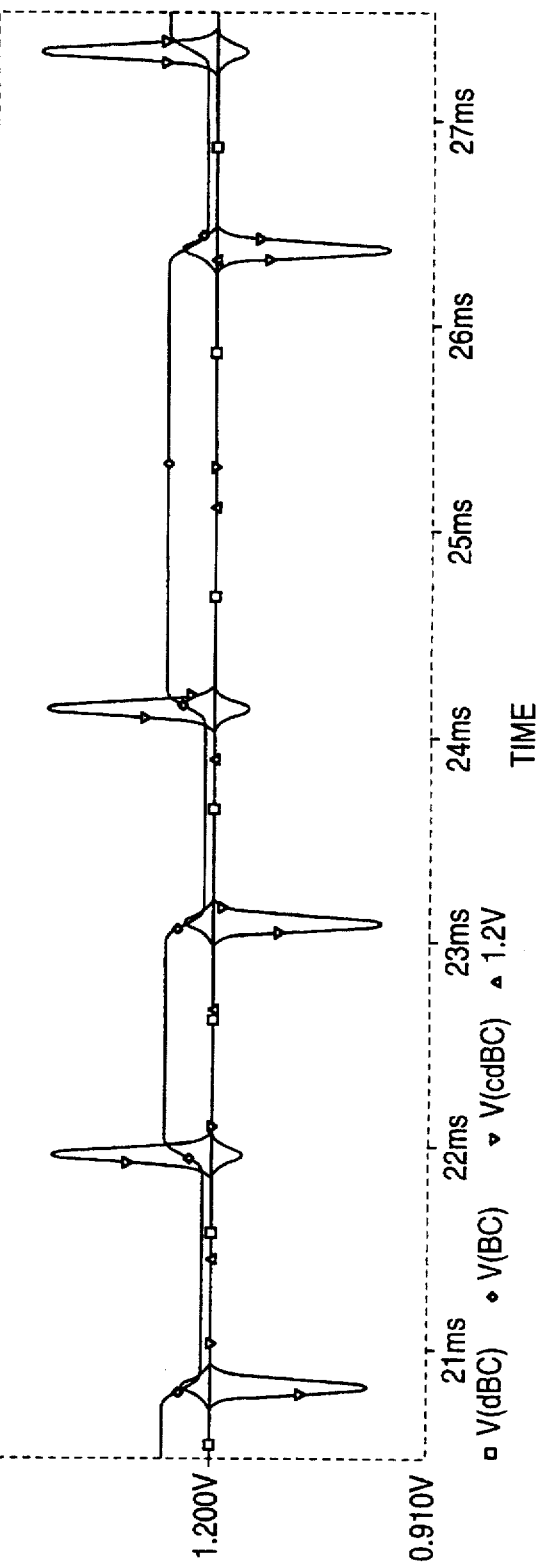

As shown in FIGS. 2a and 2c, the digitizer output changes state when its noninverting input voltage U2a+ is approximately 200 millivolts (the hysteresis voltage) above the reference voltage 1.2 volts. In other words, the comparator U2a is set to trip or change state when the noninverting input exceeds or falls below the bias on the inverting input. At higher frequencies, this hysteresis affect is not readily visible (which is the case in FIG. 2a), because of the propagation delay of a few microseconds through the comparator up amp U2a.

Also, the change in state of the output of U2A only occurs on the leading edge of ccdBC as is apparent from FIG. 2c, because even though compressed and amplified, the peak pulses, due to differentiation, return to the reference voltage (1.2 volts) and do not go negative. Thus, the comparator U2A cannot change state until the next transition occurs when the voltage goes negative below the reference voltage. This occurs at the second, fourth and sixth peaks of the exemplary wave form shown in FIG. 2c.

It is desirable to restore or set the output of the digitizer to the white state, utilizing a control bit from the microprocessor on initialization of the scanner. If the circuit was initialized on powering up into the black state, only a black to white transition would be recognized by the digitizer and any white to black transitions would be missed. Since all bar code symbologies use a leading white zone prior to the start of bar code data, it is desirable that the circuit be initialized to start up in the white state at the start of scanning. The initializing pulse may be applied either on power up where scanning is continuous, or at the beginning of each scan or if the digitizer remains in the black state for a period which exceeds the maximum black bandwidth for the scanner. Thus, if the restore to white level from the microprocessor is high, the PNP transistor Q1 will be conductive and will bring the noninverting terminal of U2a below the reference voltage, thus setting the output of U2a to a low level thereby restoring the output to white upon initialization.

Referring to FIG. 4, there is shown bar code circuitry utilizing a photodetector 30 responsive to light returned from the bar code (BCR). This photodetector may be part of a transimpedance amplifier such as the amplifier 10 (FIG. 1a). The output of the photodetector stage 30 is applied to a logarithmic compression amplifier 32 similar to the amplifier 14. Adjacent to the outputs of 30 and the log amplifier 32 are wave forms showing the respective signals.

The amplified and compressed signal is converted into a stream of digital values (bytes) by an analog to digital converter 34. The stream of digital values is applied to a processor 36. The processor output is the digitized, digital data signal. The processor may operate by looking for a change in the value of the byte and selecting a change which reflects accurately the transitional location. Thus, if a series of bytes delta $N_{1-p}$ changes in value by $-y$, this is taken to be a black to white (B/W) transition. On the other hand, if the change in values is $+y$, a white to black transition is indicated. Similarly, a change in value from black to white equal to $+z$, or white to black equal to $-z$, may be utilized if the polarity of the bar code signal is opposite.

Alternatively, the bytes from the ADC 34, may be processed by performing an inverse logarithmic function and providing an output which is the inverse log of the input. For example, ten raised to the power equal to the binary value of the byte. Then, the processor will output a string of binary values representing the original signal, but undistorted and with precise leading and lagging edges which are at the location of the transition (B/W or W/B). By converting (Digital to analog conversion) the BCR signal can be restored so as to provide the digitized, digital data signal.

From the foregoing description, it will be apparent that there has been provided improved bar code circuitry. Variations and modifications in the herein described circuitry, within the scope of the invention, will undoubtedly suggest themselves to those skilled in the art. Accordingly, the foregoing description should be taken as illustrative and not in a limiting sense.

I claim:

1. Circuitry for a bar code scanner which processes light return from bars of different reflectivity constituting the bar code as the code is scanned to provide a digital data signal of pulses, the temporal relationship of which represents the width of the bars of the code and the data represented by the code, said circuitry comprising a detector which translates the return light into a first electrical signal, a first amplifier including said detector for amplifying said first signal and providing a second electrical signal which varies in amplitude in accordance with the amplitude of said first signal, a second amplifier connected to said first amplifier and amplifying said second signal, said second amplifier having a gain characteristic which varies inversely with the amplitude of the second signal to provide a third signal the amplitude variation of which is compressed with respect to the amplitude variation of said second signal, a digitizer connected to said second amplifier which converts said third signal into said pulses, said pulses having leading and lagging edges when said third signal has at least certain changes in amplitude respectively in first and second senses which are opposite to each other, thereby providing said digital data signal.

2. The circuitry according to claim 1 further comprising a differentiating stage connecting said first amplifier and said second amplifier and providing as said second signal to said second amplifier a fourth signal which is the derivative of said second signal, and said changes in said third signal corresponding to said leading and lagging edges are also of opposite relative polarity.

3. The circuitry according to claim 2 wherein said differentiating stage includes a third amplifier having gain so that fourth signal has greater amplitude than said second signal.

4. The circuitry according to claim 2 wherein said digitizer includes means responsive only to the edges of said third signal which have at least certain changes in amplitude and are of opposite relative polarity thereby preventing said digitizer from responding to trailing edges due to differentiation of said second signal in said differentiating stage which are not of said opposite relative polarity.

5. The circuitry according to claim 1 wherein said second amplifier has gain for AC signals which is larger than gain for DC signals.

6. The circuitry according to claim 5 wherein said gain for DC signals is sufficiently small to prevent the propagation of DC offset voltage through said second amplifier.

7. The circuitry according to claim 5 wherein said second amplifier gain for DC signals is reduced by means including a capacitor for reducing the amplitude of said DC signals which propagate through said second amplifier.

8. The circuitry according to claim 7 wherein said second amplifier comprises an operational amplifier stage having inverting and non-inverting inputs and an output, a feedback circuit connected between one of said inputs and said output, said feedback circuit including a "T" network including said capacitor, and means for biasing said other input to a predetermined voltage.

9. The circuitry according to claim 8 wherein said feedback circuit further includes a pair of resistors connected between said output and said one of said inputs defining the head of said "T" and a leg connected between said resistors and a point of reference potential including at least one resistor and said capacitor in series with each other, and another capacitor of capacitance much smaller than said first name capacitor connected across one of said resistors in the head of said "T".

10. The circuitry according to claim 1 wherein said first amplifier is a transimpedance amplifier having an input and an output, said detector being connected to said input, and said amplifier having means including an impedance element for converting current flowing in said detector to said input into a voltage which is the product of said current and the impedance of said element.

11. The circuitry according to claim 10 wherein said first amplifier comprises an operational amplifier having a direct input and an inverting input, said detector being a photo-responsive junction element connected between one of said inputs and a reference potential, said operational amplifier having means for applying operating voltage thereto which is referenced to said reference potential, and the feedback circuit being connected between said one input and said output and including said impedance element.

12. The circuitry according to claim 1 wherein said second amplifier and digitizer are biased for bi-polar operation with respect to a bias voltage.

13. The circuitry according to claim 12 wherein said second amplifier and said digitizer have means for applying operating voltages thereto with respect to a reference potential which are of first and second levels which are different from each other, said digital data signal having logic levels of said second level during said pulses and of said first level between said pulses, and a network for combining said third signal and said digital data signal with offset voltages of equal amplitude and of opposite polarity depending upon whether the third signal is greater or less than the level of said data signal.

14. The circuitry according to claim 13 wherein said network has oppositely polarized diodes connected between said digitizer and said second amplifier and across which the voltage is corresponding to said third signal and said digital data signal level appears.

15. The circuitry according to claim 14 wherein said digitizer comprises a comparator having a pair of inputs and an output at which output said digital logic signal level is presented, and said network presents a resistive feedback path between one of said inputs and said output, said third signal being applied via a resistor to said one input, said diodes bridging said resistor whereby to apply said offset voltages to provide hysteresis corresponding to said offset voltages with respect to a bias voltage applied to the other input of said comparator.

16. The circuitry according to claim 15 further comprising means for initializing the logic level at said output of said digitizer, said initializing means being connected to said one of said inputs of said comparator.

17. The circuitry according to claim 1 wherein said gain characteristic is a non-linear gain characteristic.

18. The circuitry according to claim 17 wherein said non-linear gain characteristic is logarithmic.

19. The circuitry according to claim 1 wherein said gain characteristic changes from a linear characteristic to said characteristic which varies inversely with amplitude of said second signal when said second signal amplitude exceeds a certain amplitude.

20. The circuitry according to claim 19 wherein said linear characteristic is provided by a first element having a linear current-voltage characteristic and through which current in said second amplifier flows, said first element being bridged by a second element having a non-linear current-voltage characteristic when said second element becomes conductive when the voltage across said second element exceeds the certain threshold.

21. The circuitry according to claim 20 wherein said second element has a P-N junction.

22. The circuitry according to claim 21 wherein said second element is a P-N junction diode and said characteristic is logarithmic.

23. The circuitry according to claim 22 wherein said second element is connected in parallel with a third element which is another P-N junction diode polarized in a sense opposite to said P-N junction diode which provides said first element.

24. The circuitry according to claim 20 further comprising means connected to said element for changing the gain provided by said second amplifier.

25. The circuitry according to claim 24 wherein said gain changing means comprises a "T" network having a head provided by said first element and a leg provided by a resistor, and means for selectively presenting an essentially open or short circuit across said resistor corresponding to oppositely valued weighted states (zero and one) states to change the gain of said amplifier.

26. The circuitry according to claim 20 wherein said second amplifier comprises an operational amplifier having inverting and non-inverting inputs and an output, a feedback circuit connected between one of said inputs and said output, said feedback circuit comprising said first element bridged by said second element, and means for biasing the other of said inputs at a certain voltage.

27. The circuitry according to claim 26 wherein said second element is a P-N junction diode and said characteristic is logarithmic.

28. The circuitry according to claim 27 wherein said second element is connected in parallel with a third element which is also a P-N junction diode polarized in a sense opposite to said P-N junction diode which provides the first element.

29. The circuitry according to claim 26 further comprising means connected to said first element for changing the gain provided by said second amplifier said gain changing means comprising a "T" network having a head provided by said first element and a leg provided by a resistor, and means for selectively presenting an essentially open circuit and an essentially short circuit across said resistor corresponding to oppositely valued binary states (zero and one states).

30. The circuitry according to claim 29 wherein said "T" network further comprises a capacitor connected between said leg and said resistor at one end thereof and said leg includes a capacitor connected in series with said resistor across which said open or short circuits is presented.

31. The circuitry according to claim 1 wherein said second amplifier comprises first and second stages connected in tandem, said second stage providing said third signal as the output therefrom, each of said stages having said gain characteristic which varies inversely with amplitude.

32. The circuitry according to claim 31 wherein each of said stages has a gain characteristic which changes from a linear characteristic to said characteristic which varies inversely with amplitude of said second signal when said second signal amplitude exceeds a certain amplitude.

33. The circuitry according to claim 32 wherein said linear characteristic of each of said stages is provided by a first element having a linear current-voltage characteristic through which current in each of said stages flows, the first element being bridged by a second element having a non-linear current-voltage characteristic when said second element becomes conductive when the voltage across said second element exceeds a certain threshold.

34. The circuitry according to claim 33 wherein said second element in each of said stages is a P-N junction diode and said characteristic is logarithmic.

35. The circuitry according to claim 34 wherein said second element of each of said stages is connected in parallel with a third element which is a P-N junction diode polarized in a sense opposite to said P-N junction diode which provides said second element.

36. The circuitry according to claim 33 wherein each of said stages has gain changing means comprising a "T" network having a head provided by said first element and a leg provided by a resistor, and means for selectively presenting an essentially open or short circuit conditions across said resistor corresponding to oppositely valued binary related states (zero and one states) to change the gain of said amplifier.

37. The circuitry according to claim 36 wherein each of said stages has different gain when said gain changing means is in different ones of said weighted states so that the total gain of said second amplifier is variable in steps which are generally in correspondence with the binary number, the digits of which consist of the states corresponding to said open and short circuit conditions.

38. The circuitry according to claim 1 wherein said digitizer comprises means for converting said third signal into a stream of digital bytes, and means for processing said bytes in accordance with the values which said bytes represent to detect said certain changes in amplitude occurs.

39. The circuitry according to claim 38 wherein said processing means includes means for detecting when certain changes in value of a plurality of said bytes which are consecutive occurs.

40. The circuitry according to claim 38 wherein said stream of bytes is a first stream of bytes and wherein said processing means converts said first stream of bytes to a second stream of bytes having values related to the values of said first stream in accordance inversely with said gain characteristic from which said pulses can be produced.

* * * * *